United States Patent [19]  
Lindner et al.

[11] Patent Number: 4,563,496  
[45] Date of Patent: Jan. 7, 1986

[54] SELF-EXTINGUISHING THERMOPLASTIC MOULDING COMPOSITIONS OF POLYCARBONATE AND ABS-POLYMERS

[75] Inventors: Christian Lindner, Cologne; Friedemann Müller, Neuss; Horst Peters, Leverkusen; Hans-Jürgen Kress; Josef Buekers, both of Krefeld, all of Fed. Rep. of Germany

[73] Assignee: Bayer Aktiengesellschaft, Leverkusen, Fed. Rep. of Germany

[21] Appl. No.: 661,202

[22] Filed: Oct. 15, 1984

[30] Foreign Application Priority Data

Oct. 22, 1983 [DE] Fed. Rep. of Germany ....... 3338502

[51] Int. Cl.$^4$ .................... C08K 3/22; C08L 69/00
[52] U.S. Cl. .................... 524/430; 524/405; 524/408; 524/414; 524/417; 524/424; 524/437; 524/508; 525/147; 525/468
[58] Field of Search ............ 525/67, 86, 147, 468; 524/508, 405, 408, 414, 417, 424, 437, 430

[56] References Cited

U.S. PATENT DOCUMENTS 3,947,524  3/1976  Hozumi et al. ................ 525/67  
4,404,323  9/1983  Van der Leos et al. ......... 525/86  
4,482,672  11/1984 Neuray et al. ................ 525/67

FOREIGN PATENT DOCUMENTS 0012357  6/1980  European Pat. Off. .  
0034252  8/1981  European Pat. Off. .  
0064648  11/1982 European Pat. Off. .  
1253226  11/1971 United Kingdom .

Primary Examiner—Theodore E. Pertilla  
Attorney, Agent, or Firm—Connolly and Hutz

[57] ABSTRACT

This invention relates to self-extinguishing thermoplastic moulding compositions of an aromatic polycarbonate containing a co-condensed halogen, a thermoplastic copolymer containing nucleus-alkylated styrene and an ABS as graft copolymer.

1 Claim, No Drawings

SELF-EXTINGUISHING THERMOPLASTIC MOULDING COMPOSITIONS OF POLYCARBONATE AND ABS-POLYMERS

This invention relates to self-extinguishing thermoplastic moulding compositions of an aromatic halogen containing polycarbonate, a thermoplastic copolymer containing nucleus-alkylated styrene and an ABS graft copolymer.

Thermoplastic moulding compositions of mixtures of polycarbonates based on aromatic dihydroxy compounds and ABS polymers are known. In addition to their favourable technological properties they are often required to self-extinguish, after a brief flame application, especially for uses in electrical engineering, electronics and transport. The burning properties of such compositions may be assessed in accordance with UL-94.

Halogen compounds as flameproofing agents reduce the flammability of moulding compositions of polycarbonate and ABS. According to DE-PS 2,259,656, DE-OS 3,329,548 and DE-OS 2,329,546, halogen-containing polycarbonates may even be mixed with ABS to reduce the flammability thereof. However, they only acquire a rating of at least V2 in the UL 94 test by the addition of antimony trioxide and halogen compound or by the use of very large quantities of halogen compound. In order to reduce corrosion damage by halogen in the event of fire, the quantities of halogen used are preferably as small as possible. In addition, large quantities of halogen have an adverse effect upon product properties, for example mechanical strength and dimensional stability under heat, and also cause surface faults such as streaks.

Antimony trioxide in combination with halogen compounds narrows the processing conditions of the material. Efforts have to be made to avoid thermal damage of the material by antimony trioxide.

At relatively high processing temperatures (for example above 290° C.), which are required in the production of complicated mouldings of large surface area or large volume antimony trioxide may produce surface faults, for example in the form of blisters and streaks, and also depolymerization (reduction in mechanical strength, for example notched impact strength).

It has now been found that thermoplastic moulding compositions of aromatic polycarbonate, a graft copolymer and a thermoplastic copolymer are self-extinguishing as defined in UL-94, if the aromatic polycarbonate contains halogen and the thermoplastic copolymer contains nucleus-alkylated styrene in copolymerized form. These moulding compositions can additionally contain organic halogen compounds as flameproofing agents and certain inorganic flameproofing additives. Antimony trioxide is not necessary. Accordingly, these moulding compositions do not have the disadvantages described above.

The present invention relates to self-extinguishing thermoplastic moulding compositions of:
(a) from 20 to 80%, by weight, based on (a)+(b)+(c), of a copolycarbonate of a dihydric phenol and a dihydric halogenated phenol, the copolycarbonate containing from 3 to 20%, by weight, of cocondensed halogen;
(b) from 10 to 70%, by weight, based on (a)+(b)+(c) of a thermoplastic copolymer of:
(1) from 10 to 90%, by weight, based on copolymer, of a nucleus-alkylated styrene corresponding to the following general formula I:

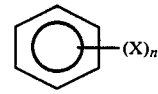
(I)

wherein
X represents methyl, ethyl, n-propyl or isopropyl; and
n represents integer of from 1 to 5;
(2) from 80 to 0%, by weight, of styrene and/or α-methyl styrene; and
(3) from 10 to 30%, by weight, of acrylonitrile;
(c) from 10 to 70%, by weight, based on (a)+(b)+(c), of a graft polymer of styrene, α-methyl styrene, nucleus-substituted styrene of formula (I) or mixtures, thereof, on the one hand, and acrylonitrile, methyl methacrylate or mixtures thereof, on the other hand on particulate, at least partially crosslinked rubbers having a glass transition temperature of ≦20° C., an average particle diameter ($d_{50}$) of from 0.1 to 5 μm and a gel content (in toluene) of >50%, by weight; and, optionally,
(d) from 0 to 12 parts, by weight, per 100 parts, by weight, of (a)+(b)+(c), of a halogen-containing organic flameproofing compound; and
(e) from 0 to 5 parts, by weight, per 100 parts, by weight, of (a)+(b)+(c), of tin dioxide, calcium phosphite, calcium hypophophite, zinc borate, aluminium oxide, cryolite, bismuth oxide or barium carbonate.

Aromatic polycarbonates are polycarbonates of one or more of the following diphenols: hydroquinone, resorcinol, dihydroxydiphehyls, bis-(hydroxyphenyl)-alkanes, bis-(hydroxyphenyl)cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, α,α'-bis-(hydroxyphenyl)-diisopropylbenzenes; the phenyl radicals may even carry alkyl substituents and halogen atoms. These and other suitable diphenols are described, for example, in U.S. Pat. Nos. 3,028,365; 2,999,835; 3,148,172; 3,275,601; 2,991,273; 3,271,367; 3,062,781 and 2,999,846, in DE-OS 1,570,703, 2,063,050; 2,063,052, 2,211,956 and 2,211,957, in FR-PS 1,561,518 and in H. Schnell's book entitled "Chemistry and Physics of Polycarbonates", Interscience Publishers, New York, 1964.

Preferred polycarbonates are polycarbonates based on bis-(4-hydroxyphenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxyphenyl)-1,1-cyclohexane (bisphenol Z), bis-(hydroxyphenyl)-methane (bisphenol F), bis-(4-hydroxy-3,5-dimethyl)-2,2-propane (tetramethyl bisphenol A) and also polycarbonates based on trinuclear bisphenols, such as α-α'-bis-(4-hydroxyphenyl)-p-diisopropyl benzene.

Copolycarbonates which, in addition to tetrabromobisphenol A, contain one of the other preferred diphenols are particularly preferred.

Other preferred polycarbonates are those based on 2,2-bis-(4-hydroxyphenyl)-propane or 2,2-bis-(3,5- dimethyl-4-hydroxyphenyl)-propane in addition to tetrabromobisphenol A. The aromatic polycarbonates may be produced in known manner, for example by transesterification in the melt from bisphenol and diphenyl carbonate and in solution from bisphenols and phosgene. The solution may be homogeneous ("Pyridine process") of heterogeneous ("two-phase interfacial process"). According to the present invention, polycarbonates which have been produced in solution, particularly by the two-phase interfacial process are particularly suitable.

The aromatic polycarbonates may be branched by the incorporation of small quantities, preferably from 0.05 to 2 mole percent, based on the diphenols used, of trifunctional or more than trifunctional compounds, for example those containing 3 or more phenolic hydroxy groups.

Molecular weight is regulated by the addition of the conventional quantities of chain-terminators, such as phenol, p-t-butyl phenol and 2,4,6-tribromophenol. The aromatic polycarbonates should generally have average number-average molecular weights $M_w$ of from 10,000 to more than 200,000 preferably from 20,000 to 80,000, as determined by measurements of the relative viscosity in $CH_2Cl_2$ at 25° C. using a concentration of 0.5%, by weight.

The thermoplastic copolymer (b) of the moulding compositions according to the present invention is a copolymer of nucleus-alkylated styrene, such as o-, m- and p-$C_1$-$C_3$ alkyl styrene or poly-nucleus-substituted $C_1$-$C_3$ alkyl styrenes, more particularly o-, m- and p-methyl styrene. Comonomers for the polymer (b) are acrylonitrile, styrene and α-methyl styrene. Preferred polymers (b) contain at least 10%, by weight, of monomers corresponding to general formula (I) in copolymerized form:

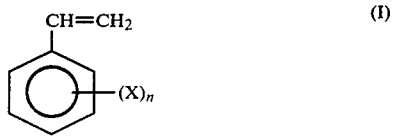

(I)

wherein
X represents $CH_3$, $C_2H_5$ and $C_3H_7$; and
n represents 1-5;
and from 10 to 40% by weight, of incorporated acrylonitrile. Preferred polymers (b) are copolymers of from 90 to 70%, by weight, of monomer (I), more particularly p-methyl styrene, and from 10 to 30%, by weight, of acrylonitrile and also copolymers of from 10 to 50%, by weight, of monomer (I) and from 90 to 50%, by weight, of styrene acrylonitrile mixtures. Copolymers (b) suitable for use in accordance with the present invention are completely or partially soluble in organic solvents; they may be uncrosslinked or partially cross-linked. Uncross-linked copolymers generally have Staudinger indices of from 0.3 to 1.5 dl/g as measured in DMF at 25° C., preferably from 0.3 to 0.8 dl/g more preferably from 0.4 to 0.8 dl/g.

The copolymers (b) may be produced in known manner by radical or thermal polymerization. Particularly suitable polymerization processes are emulsion polymerization, bead polymerization or mass or solution polymerization, optionally initiated by inorganic or organic peroxides, hydroperoxides or azo-compounds and optionally carried out in the presence of molecular weight regulators. The polymerization process is preferably carried out at from 30° to 150° C., more preferably from 40° to 80° C.

The third constituent of the moulding compositions according to the present invention are rubber-based graft polymers (c). In these products, a monomer mixture of the monomers styrene, α-methyl styrene, acrylonitrile, methyl methacrylate or nucleus-substituted alkyl styrene of formula (I) is graft-polymerized onto a rubber. Suitable rubbers are, in particular, polybutadiene, butadiene styrene copolymers containing up to 30%, by weight, of copolymerized styrene, copolymers of butadiene and up to 33%, by weight, of acrylonitrile or copolymers of butadiene with up to 20%, by weight, of a lower alkyl (preferably $C_1$-$C_6$) ester of acrylic or methacrylic acid, other preferred rubbers are alkyl acrylate rubbers or ethylene propylene diene monomer (EPDM) rubbers. In principle, any elasticizing component can be used as the rubber providing it shows rubber-elastic behaviour.

The ratio, by weight, of rubber to graft-polymerized monomers should be from 80:20 to 5:95. The rubbers in the graft polymers have particles of average diameter ($d_{50}$) of from 0.1 to 5 μm, preferably from 0.2 to 1 μm. In addition, they are at least partially cross-linked.

Such graft polymers are known. They may be produced, for example, by polymerization of the monomers in the presence of radical catalysts and in the presence of a rubber (particularly in the form of a rubber latex).

Particularly suitable graft polymers (c) are graft polymers of styrene/acrylonitrile in admixture on diene rubber, so-called ABS-polymers, or graft polymers of monomer (I)/acrylonitrile mixtures, optionally containing styrenes as additional monomer, on diene rubbers; these particularly suitable graft products (c) preferably have a rubber content of ≧30%, by weight, more preferably ≧50%, by weight.

In addition to the grafting reaction of monomers onto rubbers, free copolymers of the monomers used for grafting are also formed.

These free copolymers are identical in composition to the graft component of constituent (c). However, a resin may also be added to the graft polymer. The graft polymer may have a different structure. Thus, it is possible, for example, to use an ABS polymer consisting of a mixture of graft copolymer and SAN-copolymer as constituent (c).

Suitable organic halogen-containing compounds (d) are flameproofing agents, such as hexachlorocyclopentadiene, hexabromodiphenyl, octabromodiphenyl, tribromophenoxymethane, decabromodiphenyl, decabromodiphenyl, oxide, octabromodiphenyl oxide, bis-(2,4,6-tribromophenyl)-carbonate, tetrabromophthalimide, hexabromobutene, trichlorotetrabromotoluene, pentabromophenyl triphosphate, hexabromocyclododecane and oligomeric and/or polymeric, nucleus-brominated polyphenylene oxides, used in quantities of from 1 to 12%, by weight, based on (a)+(b)+(c) preferably from 3 to 8%, by weight.

Synergistic tin dioxide, calcium phosphite, calcium hypophosphite, zinc borate, aluminium oxide, cryolite, bismuth oxides or barium carbonates may optionally be added as further flameproofing agents (e) in quantities of up to 5% by weight, based on (a)+(b)+(c).

The burning properties of the compositions were tested by Test UL 94 (Underwriters Laboratories Inc.), the test specimens being vertically arranged.

Notched impact strength was determined in accordance with DIN 53 453.

EXAMPLES AND COMPARISON TESTS

The parts, by weight, indicated in the following Table of polycarbonate, component (A), and of ABS, components (B) and (C), and the inorganic additives (D) were mixed in a twin-screw extruder at approximately 260° C., homogenized granulated and injection-moulded to form test specimens.

A polycarbonate (hereinafter referred to as (A) of bisphenol A and 10%, by weight, of co-condensed tetrabromobisphenol A having a relative solution viscosity of 1.284, as measured in methylene chloride at 25° C. using a concentration of 0.5%, by weight, was used for the Examples.

An ABS polymer (hereinafter referred to as (B) consisting of:
40 parts, by weight, of an emulsion graft polymer of 36 parts, by weight, of styrene and 14 parts, by weight, of acrylonitrile on 50 parts, by weight, of a coarsely particulate highly cross-linked polybutadiene rubber having a particle diameter $d_{50}$ of 0.4 μm; and
60 parts, by weight, of an emulsion copolymer of 78 parts, by weight, of p-methyl styrene and 22 parts, by weight, of acrylonitrile having an L-value of 53, as measured in DMF at 25° C.;
was used for the Examples according to the present invention.

An ABS polymer (hereinafter referred to as (C) consisting of:
40 parts, by weight, of an emulsion graft polymer of 36 parts, by weight, of styrene and 14 parts, by weight of acrylonitrile on 50 parts, by weight, of a coarsely particulate, highly cross-linked polybutadiene rubber having a particle diameter $d_{50}$ of 0.4 μm; and
60 parts, by weight, of an emulsion copolymer resins of 72% of styrene and 28% of acrylonitrile and having an L-value of 54, as measured in DMF at 25° C.; was used for comparison purposes.

The ABS components, (B) and (C), prepared by mixing resin and graft latex and stabilized with phenolic antioxidants, were isolated by coagulation of the emulsion mixture and dried.

We claim:

1. Self-extinguishing thermoplastic moulding compositions of:
    (a) from 20 to 80%, by weight, based on (a)+(b)+(c), of a copolycarbonate of a dihydric phenol and a dihydric halogenated phenol, the copolycarbonate containing from 3 to 20%, by weight, of co-condensed halogen;
    (b) from 10 to 70% by weight, based on (a)+(b)+(c), of a thermoplastic copolymer of:
        (1) from 10 to 90%, by weight, based on copolymer, of a nucleus-alkylated styrene corresponding to the following general formula:

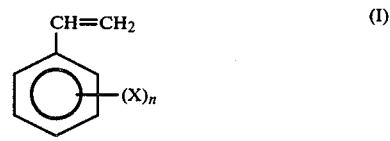

wherein
    X represents methyl, ethyl, n-propyl or isopropyl; and
    n represents an integer of from 1 to 5;
        (2) from 80 to 0%, by weight, of styrene α-methyl styrene or a mixture thereof; and
        (3) from 10 to 30%, by weight, of acrylonitrile;
    (c) from 10 to 70%, by weight, based on (a)+(b)+(c) of a graft polymer of styrene, α-methyl styrene, nucleus-substituted styrene (I) or mixtures thereof, on the one hand, and acrylonitrile, methyl methacrylate or mixtures thereof, on the other hand, on particulate, at least partially cross-linked rubbers having a glass transition temperature of ≦20° C., an average particle diameter ($d_{50}$) of from 0.1 to 5 μm and a gel content (in toluene) of >50%, by weight,
    (d) from 0 to 12 parts, by weight, per 100 parts, by weight, of (a)+(b)+(c), of a halogen-containing organic flameproofing compound; and
    (e) from 0 to 5 parts, by weight, per 100 parts, by weight, of (a)+(b)+(c), of tin dioxide, calcium phosphite, calcium hypophosphite, zinc borate, aluminium oxide, cryolite, bismuth oxide or barium carbonate.

TABLE

| | PBW* (A)/ | PBW* (B) | PBW* (C) | PBW* tin dioxide | PBW* antimony oxide | V-rating according to UL 94 (test specimen thickness) | Notched impact strength** KJ/m² |
|---|---|---|---|---|---|---|---|
| Example No. (according to the present invention) | | | | | | | |
| 1 | 70 | 30 | — | — | — | V 2 (3.2 mm) | 32 |
| 2 | 70 | 30 | — | 1 | — | V 2 (3.2 mm) | 31 |
| 3 | 70 | 30 | — | 1 | — | V 2 (1.6 mm) | 31 |
| Comparison Examples | | | | | | | |
| I | 70 | — | 30 | — | 1 | V 2 (3.2 mm) | 12 |
| II | 70 | — | 30 | — | — | not determined (3.2 mm) | 25 |
| III | 70 | — | 30 | 1 | — | not determined (1.6 mm) | 25 |

*PBW = parts, by weight
**Processing temperature 260° C.

* * * * *